United States Patent [19]

Yang

[11] Patent Number: 5,039,767
[45] Date of Patent: Aug. 13, 1991

[54] PEROXY CURED (METH)ACRYLIC ESTER COMPOSITIONS EMPLOYING METAL DITHIOLATE CATALYSTS

[75] Inventor: Darchun B. Yang, West Hartford, Conn.

[73] Assignee: Loctite Corporation, Hartford, Conn.

[21] Appl. No.: 588,068

[22] Filed: Sep. 25, 1990

[51] Int. Cl.$^5$ .................... C08F 4/06; B32B 7/00
[52] U.S. Cl. .................... 526/192; 156/310; 156/314; 526/193; 526/217; 526/220; 526/221; 526/222; 526/227; 526/236
[58] Field of Search ............ 525/330.4; 526/218.1, 526/192, 220, 236; 156/310, 314

[56] References Cited

U.S. PATENT DOCUMENTS

| | | | |
|---|---|---|---|
| 3,625,930 | 12/1971 | Toback | 260/89.5 |
| 3,639,370 | 2/1972 | Edl | 260/88.7 |
| 4,367,097 | 1/1983 | Sakanaka | 528/486 |
| 4,513,127 | 4/1985 | Jacobine | 526/194 |
| 4,622,348 | 11/1986 | Jacobine | 522/27 |
| 4,764,239 | 8/1988 | Jacobine | 526/206 |

Primary Examiner—Joseph L. Schofer
Assistant Examiner—Fred Zitomer
Attorney, Agent, or Firm—Vidas & Arrett

[57] ABSTRACT

(Meth)acrylic ester formulations employing peroxy initiators have accelerated cure rates when the substrates to which they are applied, or the compositions themselves, include xanthate, dithiocarbamate or dithiophosphate salts of transition metals together with a sulfimide or similar co-accelerator compound.

23 Claims, 5 Drawing Sheets

5,039,767

PEROXY CURED (METH)ACRYLIC ESTER COMPOSITIONS EMPLOYING METAL DITHIOLATE CATALYSTS

BACKGROUND OF THE INVENTION

Anaerobic formulations, i.e. (meth)acrylic ester formulations which are oxygen stabilized and cure as a result of oxygen deprivation, have become well known since their disclosure in U.S. Pat. No. 2,628,178. The invention of formulations employing hydroperoxide catalysts which are stable without aeration which was disclosed in U.S. Pat. No. 2,895,950 (Krieble) prompted a wide range of commercial uses for such formulations including thread locking, impregnation of porous articles, gasketing and adhesive bonding applications. Acceleration of the cure of such composition has been disclosed in numerous patents. Sulfimide accelerators, particularly saccharin (benzoic sulfimide), have been used in most anaerobic formulations since the disclosure of their utility in U.S. Pat. No. 3,046,262. Other accelerator systems which are known for use in anaerobic formulations include various amine compounds as disclosed, for instance, in U.S. Pat. Nos. 3,041,322, 3,203,941 and 3,218,305 and various compounds having structures analogous to sulfimides such as disclosed in U.S. Pat. No. 4,513,127 and U.S. Pat. No. 4,622,348 and the references disclosed therein. Certain acyl hydrazine compounds are disclosed as anaerobic accelerators in U.S. Pat. Nos. 4,180,640 and 4,287,330, preferably in combination with an acid having a small pKa of 6 or less. The various known types of accelerators are often used in combination in commercial formulations.

Similar acrylic curable peroxy initiated compositions which rely on chemical activation rather than oxygen deprivation to activate cure initiation are disclosed, for instance, in U.S. Pat. Nos. 4,442,267; 4,450,030; 4,451,615 and 4,574,142. Preferred activators for such compositions are amine/aldehyde condensation products.

Formulations employing combinations of anaerobic and chemical activation are also known. For instance, in U.S. Pat. No. 3,672,942 there is described an impregnation process employing the steps of impregnating a porous article with an anaerobically curable composition and then treating the surface with a chemical activator to induce surface cure where the impregnant is exposed to oxygen. Suitable activators include solutions of amine/aldehyde condensation products, various metal salts or chelates and various thiourea or other sulfur containing compounds. While the presence of uncured surface monomer has been reduced by the improved processes of U.S. Pat. No. 3,969,552 and U.S. Pat. No. 4,165,400, it is still generally advised to use an accelerator rinse to activate cure of the composition nearest of the surface of the impregnated article. Erythrobic or ascorbic acids have become preferred impregnation surface activators in more recent years.

It has also long been known that transition metals, especially copper or iron, play an important part in the cure mechanism of peroxide initiated acrylic formulations. This is especially so in anaerobic cure mechanisms. Transition metal oxidation is often part of the redox reaction which produces free radicals from peroxy initiators. Transition metal may be supplied by the substrate itself or in the form of salts of metals incorporated into the formulation or applied to the substrate. Copper, manganese, iron, cobalt and vanadium salts are all known for this purpose, copper and iron being the most commonly used. In impregnation processes which employ aeration of the acrylic monomer formulation it is typical to add 1–10 ppm copper as a copper salt directly to the formulation. As disclosed in U.S. Pat. No. 4,632,945, combinations of copper and iron salts or complexes may also be employed.

The participation of xanthate and dithiocarbamate compounds in free radical reactions has been previously reported. The participation of dithiocarbamate and xanthate salts in free radical reactions appears very complex and occasionally contradictory. In rubbers which include unsaturated sites (e.g. natural rubber, polybutadienes and various unsaturated copolymers), these compounds are frequently used as vulcanizing agents, usually in conjunction with at least one other compound. Examples are the abstracts of JP (1982)/102974 and EP 184301. Similar activity is reported for saturated rubbers containing small amounts of epoxy or halo groups in U.S. Pat. Nos. 3,525,721 and 4,524,185. Fe or Mg dialkyldithiocarbamates cause cure of mercaptan terminated polymers in the presence of air in U.S. Pat. No. 3,991,039).

Use of xanthate or dithiocarbamate salts is taught as part of a peroxy catalyst system for emulsion polymerization of chloroprene monomer and comonomer mixtures in U.S. Pat. No. 4,814,401.

In U.S. Pat. No. 3,639,370 dialkyldithiocarbamates with an unsaturated peroxy compound such as t-butyl permalinate or t-butyl perethyl fumarate are taught as a low temperature polymerization initiation system for vinyl compounds such as acrylic esters and unsaturated polyesters.

On the other hand, dithiocarbamates are also reported as free radical inhibitors in other polymerization or vulcanization reactions.

In U.S. Pat. Nos. 3,378,510 and 4,632,950 dialkyldithiocarbamate salts are disclosed as scorch retarders (on i.e. inhibitors of premature vulcanization) for peroxy vulcanized saturated rubbery polymers. (U.S. Pat. No. 4,632,950 also identifies chlorinated polyethylene, 1,4-polybutadiene and fluoroelastomers as suitable polymers.)

U.S. Pat. No. 4,018,604 teaches dialkyldithiocarbamates (e.g. Zn dimethlydithiocarbamate) as an additive to prevent fogging of non-silver free radical photosensitive films.

U.S. Pat. No. 4,021,310 teaches use of $O_2$, copper dialkyldithiocarbamates and a conventional inhibitor such as hydroquinone as an inhibition system against polymerization during fractional distillations of acrylic monomers. Table 1 of this reference demonstrates that the dithiocarbamate is an essential ingredient of this inhibitor system.

JP (1986)/76578 describes a two-liquid type resin composition utilizing an acrylic monomer. A peroxide (e.g. cumene hydroperoxide) is placed in one part of the composition and a vanadium compound, together with a nickel xanthate compound are used in the second part. At least a portion of the monomer must have an additional functional group, as for instance a carboxylic or phosphate acid group, a hydroxy, amino amide or ether group. This reference discloses that the xanthate compound acts as a stabilizer against decomposition of the vanadium compound, and as an inhibitor against premature gelling of the vanadium containing monomer solution, not as an active ingredient of the cure system.

SUMMARY OF THE INVENTION

In one aspect this invention comprises a novel curable composition comprising:

(a) at least one (meth)acrylic ester;

(b) a polymerization initiating effective amount of a peroxy compound;

(c) an anaerobic accelerator compound having a functional group represented by the formula

—$SO_2$—NH—CO— in a conventional amount; and (d) an effective amount for accelerating polymerization of a dithiolate salt of the formula

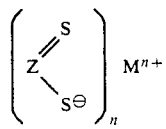

where Z is $R_2NC$, $R^1OC$, $R^1SC$ or $(OR^1)_2P$, M is an n valent transition metal selected from the group consisting of Cu, Co, Ni, Mo, Mn, Cr, Ru, Fe and V, n is 1, 2 or 3, R is a hydrocarbon or hydroxyhydrocarbon group and $R^1$ is a hydrocarbon group which is optionally substituted by one or more hydroxyl or halo groups or interrupted by one or more ether oxygen atoms.

The composition may also include other conventional accelerators such as phenyl hydrazide and amine accelerators.

The cure accelerating dithiolate salt may be applied to a substrate surface, rather than directly into the composition and still give effective acceleration. In this way the salt can be used as a cure accelerator for the composition without causing premature polymerization of the formulation. Therefore, as a further aspect of the invention there is the process of bonding or sealing two metallic substrates comprising coating at least one of the substrates with a composition comprising a dithiolate salt as specified above, applying to at least one of said substrates a composition comprising:

(a) at least one (meth)acrylic ester;

(b) a polymerization initiating effective amount of a peroxy compound; and, (c) an anaerobic accelerator compound having a functional group represented by the formula

—$SO_2$—NH—CO— in a conventional amount,
and then joining the substrates until the composition has cured.

Surface acceleration with dithiolate salts is also an advantage as a final step in an impregnation process using anaerobic sealants. Using a dilute aqueous solution comprising one of these salts as a final rinse after impregnation and cleaning is advantageous since the residual salt will accelerate cure of the composition near the surface.

DETAILED DESCRIPTION OF THE INVENTION

Figure 1:
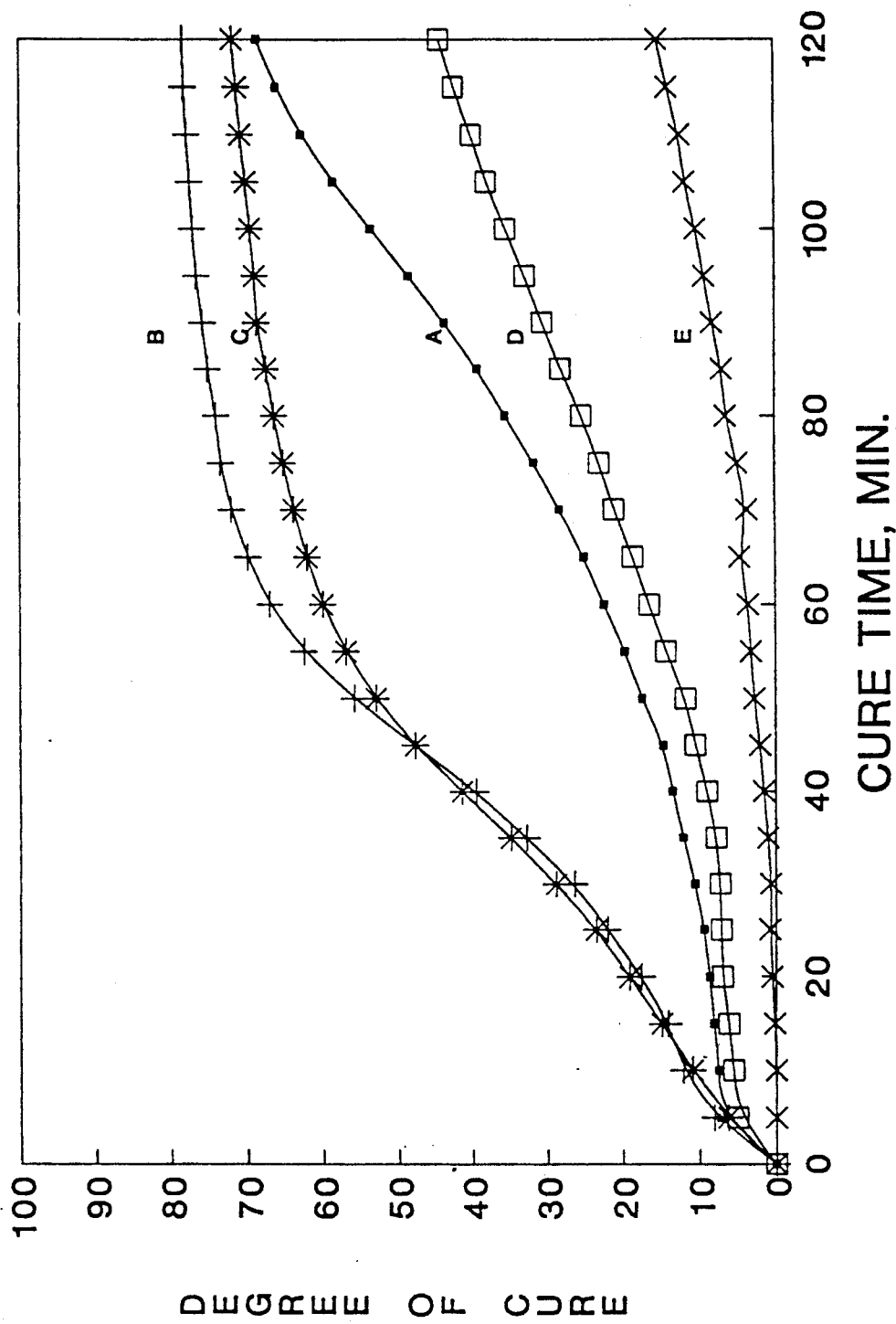
FIGS. 1–5 are plots of degree of cure versus time as determined by real time FTIR studies comparing results obtained with formulations of the invention with various comparative formulations.

The preferred radically polymerizable ethylenically unsaturated compounds employed in the photocurable compositions of the invention are (meth)acrylic ester compounds.

One class of monomers suited for use in this invention comprises acrylate esters having the following general formula:

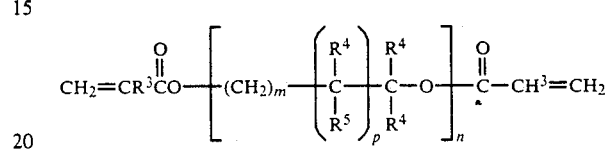

wherein $R^4$ represents a radical selected from the group consisting of hydrogen, halogen, alkyl of 1–4 carbon atoms, inclusive, hydroxyalkyl of 1–4 carbon atoms inclusive, phenyl, and

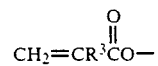

$R^3$ is a radical selected from the group consisting of hydrogen, halogen, and lower alkyl of 1–4 carbon atoms; $R^5$ is a radical selected from the group consisting of hydrogen, —OH and

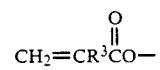

m is an integer equal to at least 1, e.g. from 1 to 8 or higher, for instance, from 1 to 4 inclusive, n is an integer equal to at least 1, for example, 1 to 20 or more; and p is 0 or 1.

The polymerizable polyacrylate esters utilized in accordance with the invention and corresponding to the above general formula are exemplified by, but not restricted to, the following materials: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate, and trimethylol propane triacrylate. Of these, the preferred monomers are triethylene glycol dimethacrylate and polyethylene glycol dimethacrylate.

In addition to the monomers described above, epoxy acrylate monomers (i.e. the reaction products of epoxy compounds or prepolymers with acrylic or methacrylic acids) and urethane acrylate capped prepolymers such as those described in U.S. Pat. Nos. 4,309,526, 4,295,909 4,018,851, 4,380,613, and 4,439,600 may be employed. Also useful are (meth)acrylic esters of alkoxylated bisphenol A, for instance ethoxylated bisphenol A diacrylates of the formula:

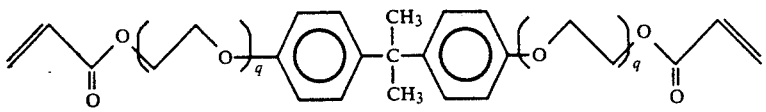

where q is an integer to at least 1, e.g. from 1 to 8 or higher, for instance, from 1 to 4 inclusive, and structurally similar compounds.

Although di- and other poly(meth)acrylate esters are preferred, monoacrylate esters can be used, particularly if the non-acrylate portion of the ester contains a hydroxyl or amino group, or other reactive substituent which serves as a site for potential crosslinking. Examples of useful mono(meth)acrylate monomers are hydroxyethyl methacrylate, cyanoethyl acrylate, t-butylaminoethyl methacrylate, glycidyl methacrylate, dicyclopentadiene methacrylate, lauryl acrylate and lauryl methacrylate. Further details on useful monomers may be found in U.S. Pat. No. 4,287,330 at Col. 3, line 51-Col. 6, line 44.

Silicones having (meth)acrylate ester functionality are another class of monomers which may be used in the invention. Examples of such silicones may be found in U.S. Pat. Nos. 3,878,263, 4,035,355, 4,348,454, 4,477,326, 4,503,208, 4,504,629, 4,575,545, 4,575,546, 4,640,940 and 4,684,538, all incorporated herein by reference.

In order to enhance shelf life of the compositions, it may be desirable to remove metal ions, if present, from the polymerizable monomer. This may be particularly desirable in the event that commercially obtained monomers, which often contain significant amounts of metal ions are employed in these compositions. Removal of metal ions may be effected by means known to those skilled in the art.

Other radically polymerizable ethylenically unsaturated compounds may also be employed in admixture with (meth)acrylate esters. Examples include maleic acid and fumeric acid esters and half esters; cinnamate esters; acrylamide and N-substituted acrylamides; acrylonitrile; vinyl functional compounds such as vinyl acetate, N-vinyl carbazole and N-vinyl pyrrolidone; and styryl functional compounds such as styrene, divinylbenzene and the styryloxy compounds described in U.S. Pat. No. 4543397, U.S. Pat. No. 4640849 and in EP 0229033. Such compounds, if employed, will represent a minor portion, suitably less than 30% of the monomer component of the formulation.

The compositions of the invention may comprise a single type of polymerizable monomer or may comprise a blend of two or more different polymerizable monomers. Preferably they are substantially 100% solids formulations, i.e. they cure to solids without substantial weight loss due to solvent volatilization, or the like.

The preferred compositions include at least one monomer or prepolymer which is characterized by at least two acrylate or methacrylate groups per molecule. Such compounds are suitably used at levels of 30% or more by weight of the composition. The improved thermal properties of the inventive compositions are usually most striking when the formulation contains a urethane acrylate or urethane methacrylate capped prepolymer.

The compositions of the inventions cure via a peroxy initiated free radical mechanism. Useful initiators are any of a wide variety of known peroxy compounds. Illustrative of such initiators are the diacyl peroxides such as benzoyl peroxide; dialkyl peroxides such as di-t-butyl peroxide; ketone peroxides such as methylethyl ketone peroxides; peresters which readily hydrolyze, e.g., t-butyl peracetate, t-butyl perbenzoate, di-t-butyl diperphthalate; and peroxycarbonates, i.e., reaction products of isocyanates and hydroperoxides. A particularly useful class of peroxy initiators are the organic hydroperoxides such as cumene hydroperoxide, methyl ethyl ketone hydroperoxide, t-butyl hydroperoxide, etc. Of these, cumene hydroperoxide is especially preferred. It is also known in the art to generate hydroperoxides in-situ by aeration of some (meth)acrylic ester monomers. The peroxy initiators should be used at a concentration of about 0.01% to about 10% by weight of the total formulation, preferably 0.1% to about 5% by weight, most preferably about 1%-3% by weight.

The compositions of the invention also include an accelerator compound having a functional group of the formula

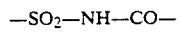

in a conventional amount. Such compounds are well known in anaerobic formulations and include sulfimide compounds of which saccharin (benzoic sulfimide) is the most widely used. Other examples of anaerobic accelerator compounds in this category are described in U.S. Pat. No. 3,046,262, 4,429,063, 4,443,587, 4,447,588, 4,513,127 and 4,622,348. For purposes of this application all such compounds will be referred to as "sulfimide type" accelerators. Typically, such compounds will be employed at levels of between about 0.01-10%, more typically 0.1-5%, preferably 1-3% by weight.

For best results, the dithiolate salts used in the anaerobic formulations of the invention should be added shortly before use on a substrate if active aeration of composition is not maintained. Thin layers of the dithiolate containing composition will remain uncured while exposed to atmospheric oxygen but even relatively small bulk volumes of the accelerated composition will begin to polymerize shortly after mixing without active aeration. This is not a serious drawback since the anaerobic formulation of the invention can readily be prepared from a two-part composition by mixing or contact diffusion of the two parts at the time of use.

The xanthate, dithiocarbamate, dithiocarboxylate and dithiophosphate salts used in the inventive formulation and process are dithiolate compounds which may be represented by the formula:

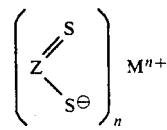

where Z is $R_2NC$, $R^1OC$, $R^1SC$ or $(OR^1)_2P$, M is an n valent transition metal selected from the group consisting of Cu, Co, Ni, Mo, Mn, Cr, Ru, Fe and V, n is 1, 2 or 3, R is a hydrocarbon or hydroxyhydrocarbon group and $R^1$ is a hydrocarbon group which is optionally substituted by one or more hydroxyl or halo groups or interrupted by one or more ether oxygen atoms. Cu, Co, Ni and Fe are preferred transition metals.

The dithiolate salts exist as neutral complexes in which the metal ion is tightly associated with the dithiolate functional group until decomposition or reaction during the redox cycle of polymeric initiation. This gives the dithiolate salts good solubility in anaerobic systems. Moreover, manipulation of the organo group can easily be performed to improve solubility of the salt in a particular monomer system. It is also believed that the dithiolate liquid or counterion can provide adhesion enhancement of the cured adhesives to metal substrates.

Solubility of the dithiolate can be modified by selection of the R or $R^1$ groups. For instance, dibenzyldithiocarbamates are more soluble in (meth)acrylate capped ethoxylated bisphenol A than are dibutyldithiocarbamates.

The effective level of dithiolate salt may be very low. For surface activation, just a few ppm on the surface can be sufficient to substantially improve the cure rate. When added to adhesive and sealant compositions, the level is generally recommended to be between 0.01 and 5.0 percent, preferably between 0.1 and 1.0 percent by weight.

Other agents such as thickeners, plasticizers, additional accelerators, colorants, adhesion promoters etc., are also known in the art and may advantageously be incorporated where functionally desirable, provided only that they do not interfere with the functioning of the composition for its intended purpose. This, of course, can be determined by simple experimentation.

The invention may be illustrated by the following non-limiting examples.

EXAMPLE 1

A base anaerobic formulation (formulation E) was prepared by adding to 100 gms triethylene glycol dimethacrylate, 2.75 ml cumene hydroperoxide and 0.7 gm benzoic sulfimide. Identical formulations (A-D) to which had been added 0.35 gms, respectively, of copper diacetylacetonate, copper ethyl xanthate, copper dimethyl dithiocarbamate, nickel dioctadecyl dithiophospate were also prepared. Cure rates of the various formulations between a sodium chloride salt plate and a polished aluminum panel (having a trace content of copper) were monitored for two hours by real time FTIR. The results of the monitoring are plotted in FIG. 1 where the measured degree of cure was determined as the percentage loss in the observed acrylic unsaturation in the formulation from the level observed immediately upon placing the formulation between the salt and aluminum plates.

As can be readily seen from FIG. 1, formulations A-D all gave significant acceleration of the cure relative to the base formulation E. Further, of the three copper containing formulations, the two within the invention (B and C) reached their cure plateau much faster (i.e. they had a much faster fixture time) than did formulation A which contained a commonly used prior art copper accelerator salt.

EXAMPLE 2

Figure 2:
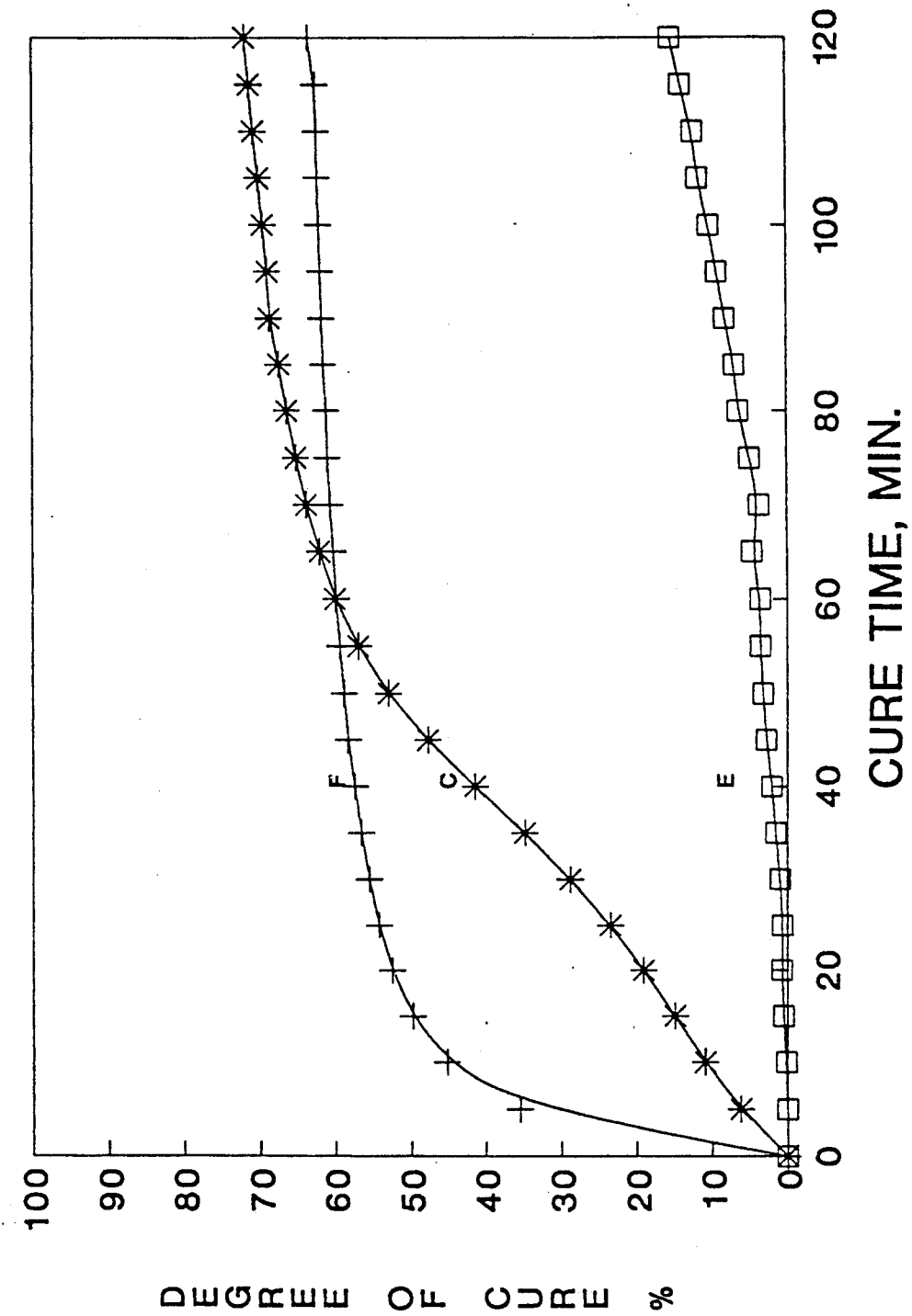

To a base formulation as in example 1 was added 0.70 gm copper dimethyl dithiocarbamate and the cure observed as in example 1. The results are plotted in FIG. 2 (formulation F) against those of the base formulation alone (E) and the base formulation with 0.35 gm of the same dithiocarbamate salt (C). The figure demonstrates the increased acceleration of cure with increased dithiocarbamate concentration as well as the somewhat lower cure plateau obtained by the faster curing formulation F.

EXAMPLE 3

Figure 3:
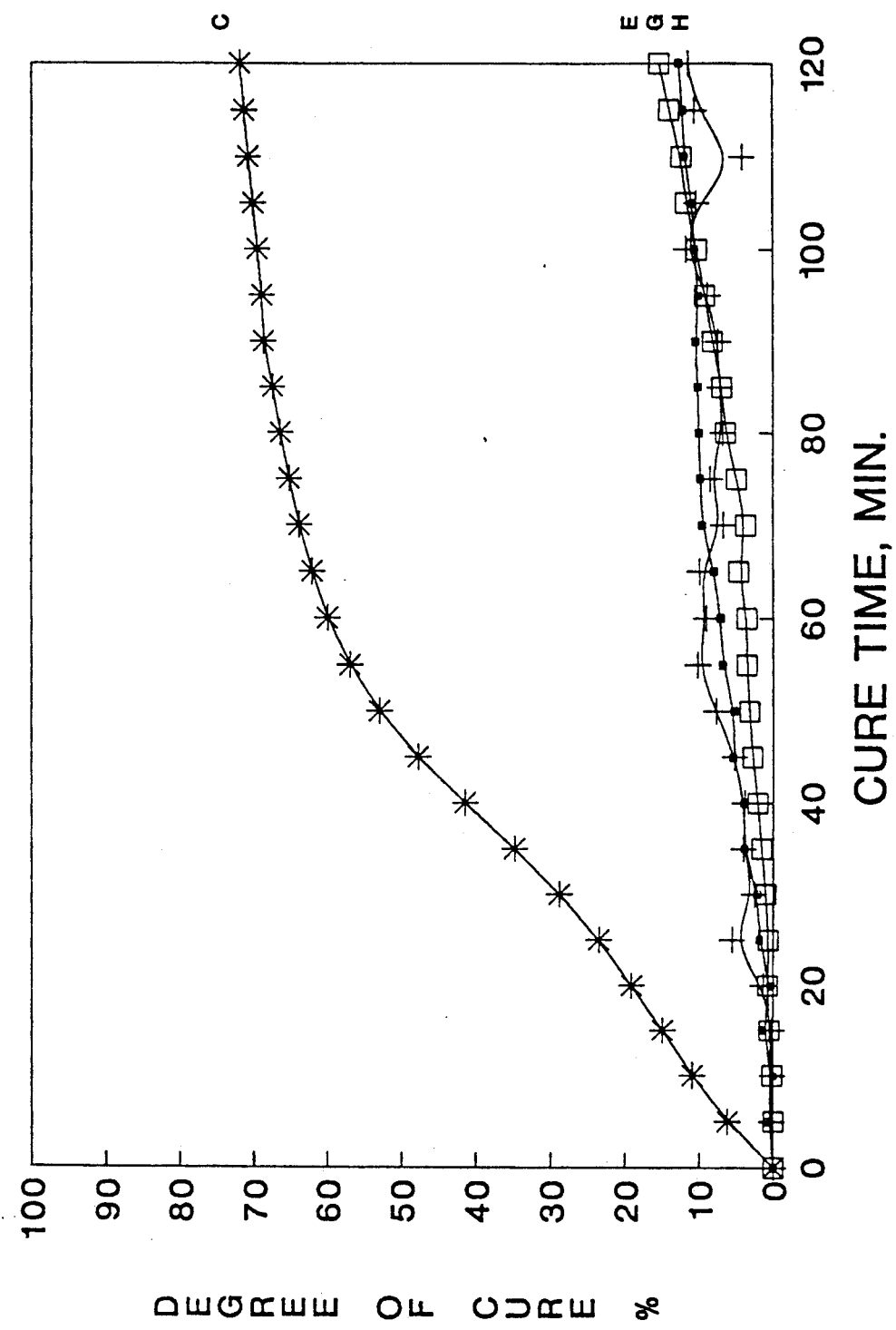

To base formulations as in example 1 were added 0.35 gm, respectively, of tetramethylthiuram monosulfide (formulation G) and tetraethylthiuram disulfide (formulation H). The cure of these compositions was observed as in example 1. The results are plotted in FIG. 3 against those of the base formulation alone (E) and the base formulation with 0.35 gm of copper dimethyldithiocarbamate (C). FIG. 3 demonstrates that the metal ion, not just the dithiolate functional group, is necessary for cure acceleration.

EXAMPLE 4

Figure 4:
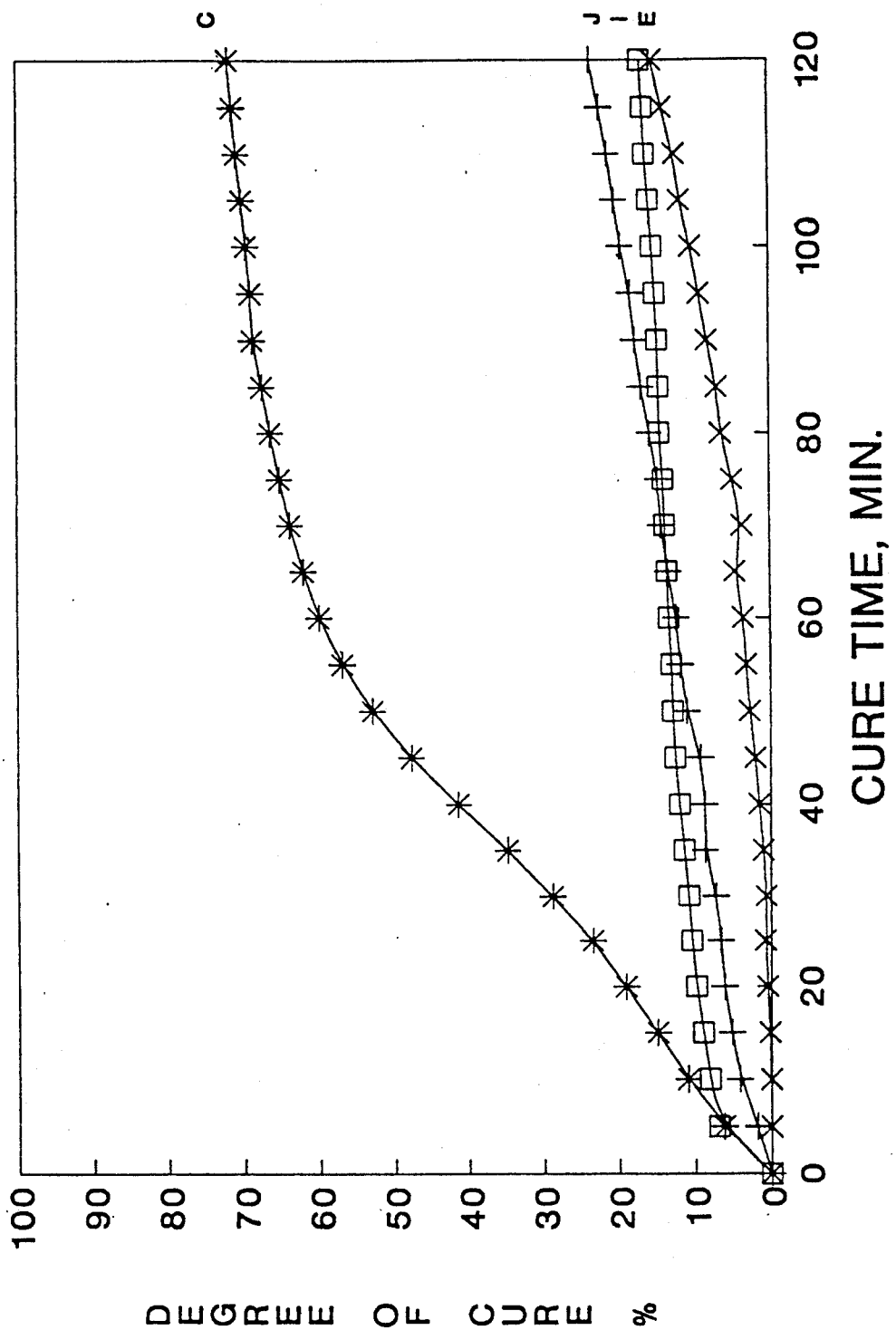

A base formulation free of sulfimide type coaccelerator (formulation I) was prepared by adding 2.75 ml cumene hydroperoxide to 100 gms triethylene glycol dimethacrylate. An identical formulation to which had been added 0.35 gm copper dimethyldithiocarbamate was also prepared (formulation J). Cure of both formulations was observed as in example 1. FIG. 4, which plots the results of these observations against the results for formulation C and E, demonstrates that the sulfimide type coaccelerator is necessary to obtain any significant acceleration with the dithiolate complex salt compounds.

EXAMPLE 5

Figure 5:
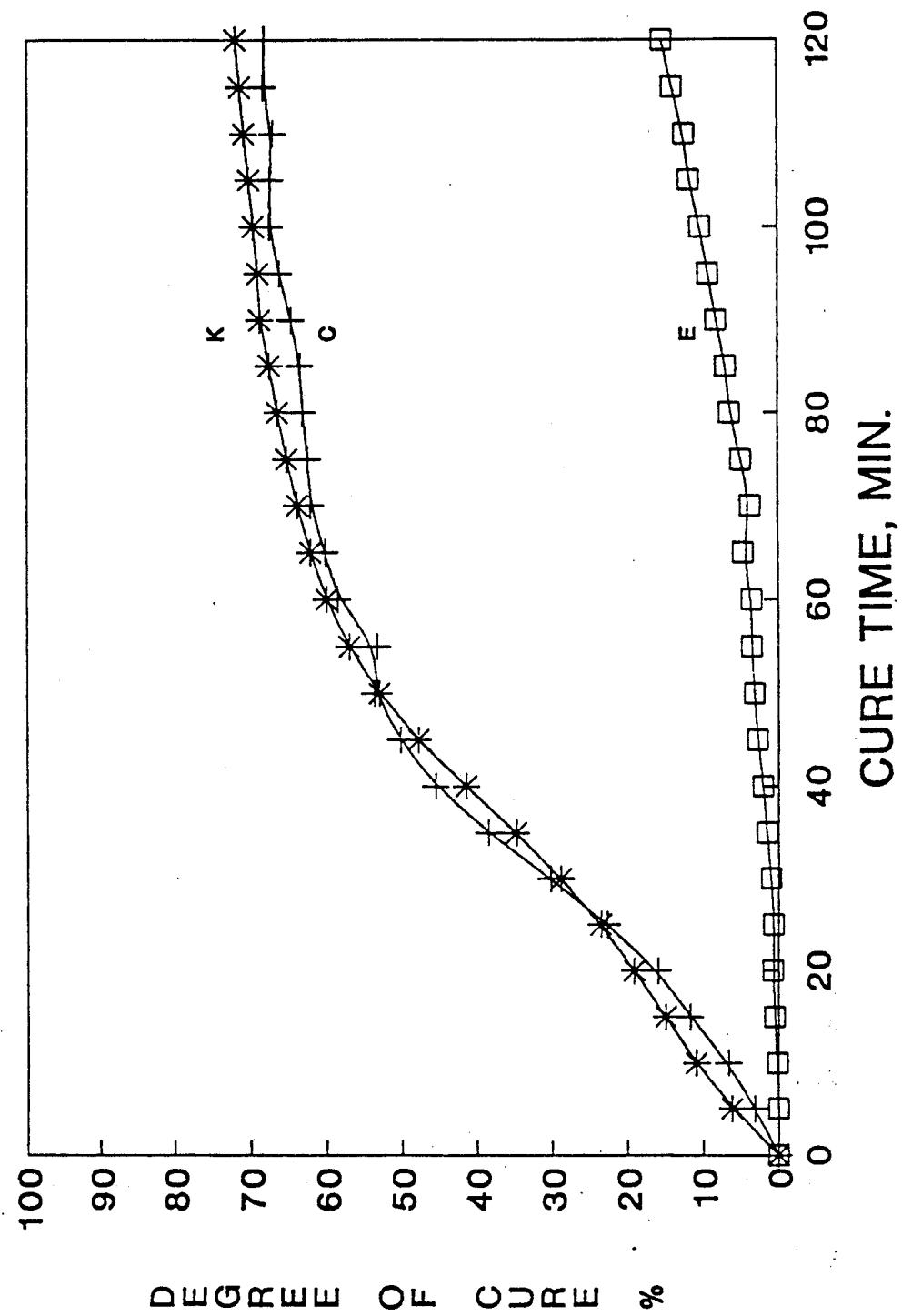

To a base formulation as in example 1 was added 0.35 gm copper bis-2-hydroxyethyldithiocarbamate and the cure observed as in example 1. The results are plotted in FIG. 5 (formulation K) against those of the base formulation E and the base formulation with 0.35 gm of copper dimethyldithiocarbamate (formulation C). FIG. 5 demonstrates that the substitution on the dithiolate group may be varied without diminishing performance.

All of the U.S. patents identified above are incorporated herein by reference.

What is claimed is:

1. A curable composition comprising:
   (a) at least one (meth)acrylic ester;
   (b) a polymerization initiating effective amount of a peroxy compound;
   (c) an anaerobic accelerator compound having a functional group represented by the formula $$-SO_2-NH-CO-$$

in a conventional amount; and
   (d) an effective amount for accelerating polymerization of a dithiolate salt of the formula

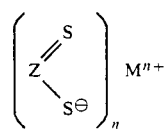

where Z is $R_2NC$, $R^1OC$, $R^1SC$ or $(OR^1)_2P$, M is an n valent transition metal selected from the group consisting of Cu, Co, Ni, Mo, Mn, Cr, Ru, Fe and V, n is 1, 2 or 3, R is a hydrocarbon or hydroxyhydrocarbon group and $R^1$ is a hydrocarbon group which is optionally substituted by one or more hydroxyl or halo groups or interrupted by one or more ether oxygen atoms.

2. A composition as in claim 1 wherein the dithiolate salt is a copper, nickel, iron or cobalt salt.

3. A composition as in claim 2 wherein the dithiolate salt is a copper salt.

4. A composition as in claim 1 wherein the dithiolate salt is a xanthate.

5. A composition as in claim 1 wherein the dithiolate salt is a dithiocarbamate.

6. A composition as in claim 1 wherein the dithiolate salt is a dithiophosphate.

7. A composition as in claim 1 wherein the dithiolate salt is a dithiocarboxylate.

8. A composition as in claim 1 wherein the dithiolate salt is present at a level of between 0.01% and 5% by weight.

9. A composition as in claim 1 wherein the dithiolate salt is present at a level of between 0.1% and 1% by weight.

10. A composition as in claim 8 wherein the R and $R^1$ groups are alkyl groups.

11. A composition as in claim 1 wherein at least 30% of said composition consists of compounds having at least two (meth)acrylic groups per molecule.

12. A formulation as in claim 1 wherein the peroxy compound is a hydroperoxide or perester.

13. A composition as in claim 1 wherein the accelerator compound (c) is present at a level of between 1% and 5%.

14. A composition as in claim 13 wherein the accelerator compound (c) is a sulfimide.

15. A composition as in claim 14 wherein the sulfimide is benzoic sulfimide.

16. The process of bonding a pair of substrates with an anaerobic formulation comprising applying a composition as in claim 1 between the substrates and joining them until fixtured.

17. A process as in claim 16 wherein M is Cu, Ni, Fe or Co.

18. A process as in claim 17 wherein the dithiolate salt is a xanthate, dithiocarbamate or dithiophosphate salt.

19. A process as in claim 18 wherein the dithiolate salt is present at a level of between 0.01% and 5% by weight.

20. The process of bonding or sealing two metallic substrates comprising coating at least one of the substrates with a composition comprising a dithiolate salt of the formula

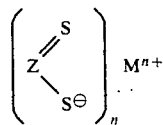

where Z is $R_2NC$, $R^1OC$, $R^1SC$ or $(OR^1)_2P$, M is an n valent transition metal selected from the group consisting of Cu, Co, Ni, Mo, Mn, Cr, Ru, Fe and V, n is 1, 2 or 3, R is a hydrocarbon or hydroxyhydrocarbon group and $R^1$ is a hydrocarbon group which is optionally substituted by one or more hydroxyl or halo groups or interrupted by one or more ether oxygen atoms, applying to at least one of said substrates a composition comprising:
(a) at least one (meth)acrylic ester;
(b) a polymerization initiating effective amount of a peroxy compound; and,
(c) an anaerobic accelerator compound having a functional group represented by the formula

in a conventional amount,
and then joining the substrates until fixtured.

21. A curable composition comprising:
(a) at least one (meth)acrylic ester;
(b) a polymerization initiating effective amount of a peroxy compound;
(c) an anaerobic accelerator compound having a functional group represented by the formula

in a conventional amount; and
(d) an effective amount for accelerating polymerization of a dithiolate salt of the formula

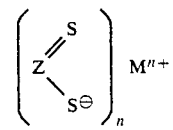

where Z is $R_2NC$, $R^1OC$, $R^1SC$ or $(OR^1)_2P$, M is an n valent transition metal selected from the group consisting of Co, Ni, Mo, Mn, Cr, Ru, Fe and V, n is 1, 2 or 3, R is a hydrocarbon or hydroxyhydrocarbon group and $R^1$ is a hydrocarbon group which is optionally substituted by one or more hydroxyl or halo groups or interrupted by one or more ether oxygen atoms.

22. A composition as in claim 21 where Z is $R_2NC$ and R is a hydroxyhydrocarbon group.

23. A curable composition comprising:
(a) at least one (meth)acrylic ester;
(b) a polymerization initiating effective amount of a peroxy compound;
(c) an anaerobic accelerator compound having a functional group represented by the formula

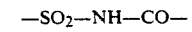

in a conventional amount; and
(d) an effective amount for accelerating polymerization of a dithiolate salt of the formula

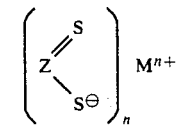

where Z is $R_2NC$, $R^1OC$, $R^1SC$ or $(OR^1)_2P$, M is an n valent transition metal selected from the group consisting of Co, Ni, Mo, Mn, Cr, Ru, Fe and V, n is 1, 2 or 3, R is a a hydrocarbon or hydroxyhydrocarbon group and $R^1$ is a hydrocarbon group which is optionally substituted by one or more hydroxyl or halo groups or interrupted by one or more ether oxygen atoms.

* * * * *

UNITED STATES PATENT AND TRADEMARK OFFICE
CERTIFICATE OF CORRECTION

PATENT NO. : 5,039,767
DATED : August 13, 1991
INVENTOR(S) : Yang, Darchun B.

It is certified that error appears in the above-identified patent and that said Letters Patent is hereby corrected as shown below:

Col. 9, line 46, delete "dithiocarbamate" and insert therefor --dithiocarboxylate--.
Col. 10, line 62, before "Co" insert --Cu,--;
line 63, delete "a hydrocarbon or".

Signed and Sealed this

Third Day of November, 1992

Attest:

DOUGLAS B. COMER

Attesting Officer

Acting Commissioner of Patents and Trademarks